US012552073B2

(12) United States Patent
Funatsu et al.

(10) Patent No.: US 12,552,073 B2
(45) Date of Patent: Feb. 17, 2026

(54) INJECTION MOLDED PRODUCT

(71) Applicant: SHOWA DENKO MATERIALS CO., LTD., Tokyo (JP)

(72) Inventors: Takeshi Funatsu, Tagawa (JP); Shingo Nakano, Tagawa (JP); Naoko Mitsuishi, Tagawa (JP); Kouji Yamada, Tagawa (JP); Hiroaki Fujino, Tagawa (JP); Hirofumi Shiokawa, Tagawa (JP); Yoji Hirai, Tagawa (JP)

(73) Assignee: RESONAC CORPORATION, Tokyo (JP)

( * ) Notice: Subject to any disclaimer, the term of this patent is extended or adjusted under 35 U.S.C. 154(b) by 715 days.

(21) Appl. No.: 17/766,659

(22) PCT Filed: Oct. 7, 2020

(86) PCT No.: PCT/JP2020/037964
§ 371 (c)(1),
(2) Date: Apr. 5, 2022

(87) PCT Pub. No.: WO2021/070854
PCT Pub. Date: Apr. 15, 2021

(65) Prior Publication Data
US 2023/0025993 A1    Jan. 26, 2023

(30) Foreign Application Priority Data
Oct. 10, 2019    (JP) ................... 2019-187076

(51) Int. Cl.
*B29C 44/42*    (2006.01)
*B29C 44/02*    (2006.01)

(52) U.S. Cl.
CPC ............ *B29C 44/428* (2013.01); *B29C 44/02* (2013.01)

(58) Field of Classification Search
CPC .............................. B29C 44/02; B29C 44/428
See application file for complete search history.

(56) References Cited

U.S. PATENT DOCUMENTS 6,977,110 B2    12/2005    Funakoshi
2013/0001818 A1    1/2013    Fujioka

FOREIGN PATENT DOCUMENTS

| JP | 2005-238726 | | 9/2005 |
|---|---|---|---|
| JP | 2005305917 A | * | 11/2005 |
| JP | 2006-69353 | | 3/2006 |
| JP | 2009-226889 | | 10/2009 |
| JP | 2017-100448 | | 6/2017 |
| JP | 2017-100449 | | 6/2017 |
| JP | 6264435 | | 1/2018 |
| JP | 2019-64203 | | 4/2019 |
| JP | 2019-64204 | | 4/2019 |

OTHER PUBLICATIONS

JP 2005-305917 Machine Translation (Year: 2005).*

* cited by examiner

*Primary Examiner* — Zachary M Davis
(74) *Attorney, Agent, or Firm* — Wenderoth, Lind & Ponack, L.L.P.

(57) ABSTRACT

An injection molded product includes a main body portion having a design surface and an opposite surface; and a projecting portion provided at a peripheral edge portion of the main body portion, and projecting out toward a side opposite from the design surface in a thickness direction of the main body portion, wherein a thickness A of the main body portion and a thickness B of the projecting portion satisfy a relationship of A≥B.

4 Claims, 9 Drawing Sheets

INJECTION MOLDED PRODUCT

TECHNICAL FIELD

The present disclosure relates to an injection molded product.

BACKGROUND ART

Resin structures are lightweight as compared with metal, and therefore, are widely used as structural parts for vehicles, parts installed in vehicles, and housings of electronic equipment and the like. Among resin structures, resin molded products in particular are lightweight, and, if used as parts for vehicles such as automobiles or the like, an improvement in fuel economy can be expected.

The method disclosed in Patent Document 1 is known as an example of a method of injection foam molding of a resin molded product that is used as a substrate for an interior part of an automobile or the like. In Patent Document 1, molten resin is injected into a cavity of a mold for molding that is formed by a moving die (movable side mold) and a fixed die (fixed side mold). Thereafter, a foaming treatment is carried out in a state in which the movable side mold has been moved so as to open slightly (core-back), and a resin molded product is thereby obtained.

PRIOR ART DOCUMENTS

Patent Documents

Patent Document 1: Japanese Patent Application Laid-Open (JP-A) No. 2005-238726

SUMMARY OF INVENTION

Technical Problem

In a case in which molten resin is injected into a cavity, the portions that contact the mold for molding are cooled and hardened, and a film-like skin layer is formed. When, in this state, the movable side mold is core-back moved with respect to the fixed side mold, and the volume of the interior of the cavity is enlarged, the molten resin that is covered by the skin layer is foamed and becomes a foamed layer, and an injection molded product that is made of resin is manufactured.

The flowing speed of the molten resin that flows within the cavity is affected by the width between the movable side mold and the fixed side mold that form the cavity. The wider the width between the movable side mold and the fixed side mold, the higher the flow speed of the molten resin tends to become.

In order to ensure strength, such as bending rigidity and the like, of an injection molded product, there are cases in which a projecting portion (hereinafter called a flange) is provided at the peripheral edge portion of the main body portion of the injection molded product. In a case in which the width between the movable side mold and the fixed side mold at the portion of the cavity, which portion corresponds to the main body portion, is more narrow than the width between the movable side mold and the fixed side mold at the portion of the cavity, which portion corresponds to the flange, the flow speed of the molten resin at the portion of the cavity corresponding to the flange is higher than the flow speed of the molten resin at the portion of the cavity corresponding to the main body portion. Thus, the molten resin that flows at the portion of the cavity corresponding to the flange moves ahead of the molten resin that flows at the portion of the cavity corresponding to the main body portion. As a result, there are cases in which the molten resin that flows at the portion of the cavity corresponding to the flange is confluent at the portion of the cavity corresponding to the main body portion, and stripe-like defects (hereinafter also called weld lines upon occasion) form at the places where the molten resin is confluent. When such weld lines appear at the design surface of the injection molded product, they may become problematic in terms of the external appearance of the injection molded product.

The present disclosure was made in view of the above-described, conventional circumstances, and an object thereof is to provide an injection molded product in which the formation of weld lines at the design surface thereof is suppressed.

Solution to Problem

Specific means for achieving the above-mentioned problems are as follows.

<1> An injection molded product comprising:
a main body portion having a design surface and an opposite surface; and
a projecting portion provided at a peripheral edge portion of the main body portion, and projecting out toward a side opposite from the design surface in a thickness direction of the main body portion,
wherein a thickness A of the main body portion and a thickness B of the projecting portion satisfy a relationship of the following formula (1), $$A \geq B \qquad \text{formula (1).}$$

<2> The injection molded product according to <1>, which is manufactured through manufacturing steps that include a step of injecting a resin material from a gate into a cavity of a mold that has: a fixed side mold having the gate through which a resin material is injected; and a movable side mold that can move in opening/closing directions with respect to the fixed side mold, and that forms the cavity, which is a gap, between the movable side mold and the fixed side mold,
wherein a distance over which the resin material flows within the cavity is less than or equal to 600 mm.
<3> The injection molded product according to <2>, wherein:
the manufacturing steps further include a step of, after filling an interior of the cavity with the resin material in the injecting step, moving the movable side mold in an opening direction from the fixed side mold, and enlarging a volume of the interior of the cavity, and
the main body portion has a foamed layer at an interior.

Advantageous Effects of Invention

In accordance with the present disclosure, there is provided an injection molded product in which the formation of weld lines at the design surface thereof is suppressed.

DESCRIPTION OF EMBODIMENTS

Figure 1:
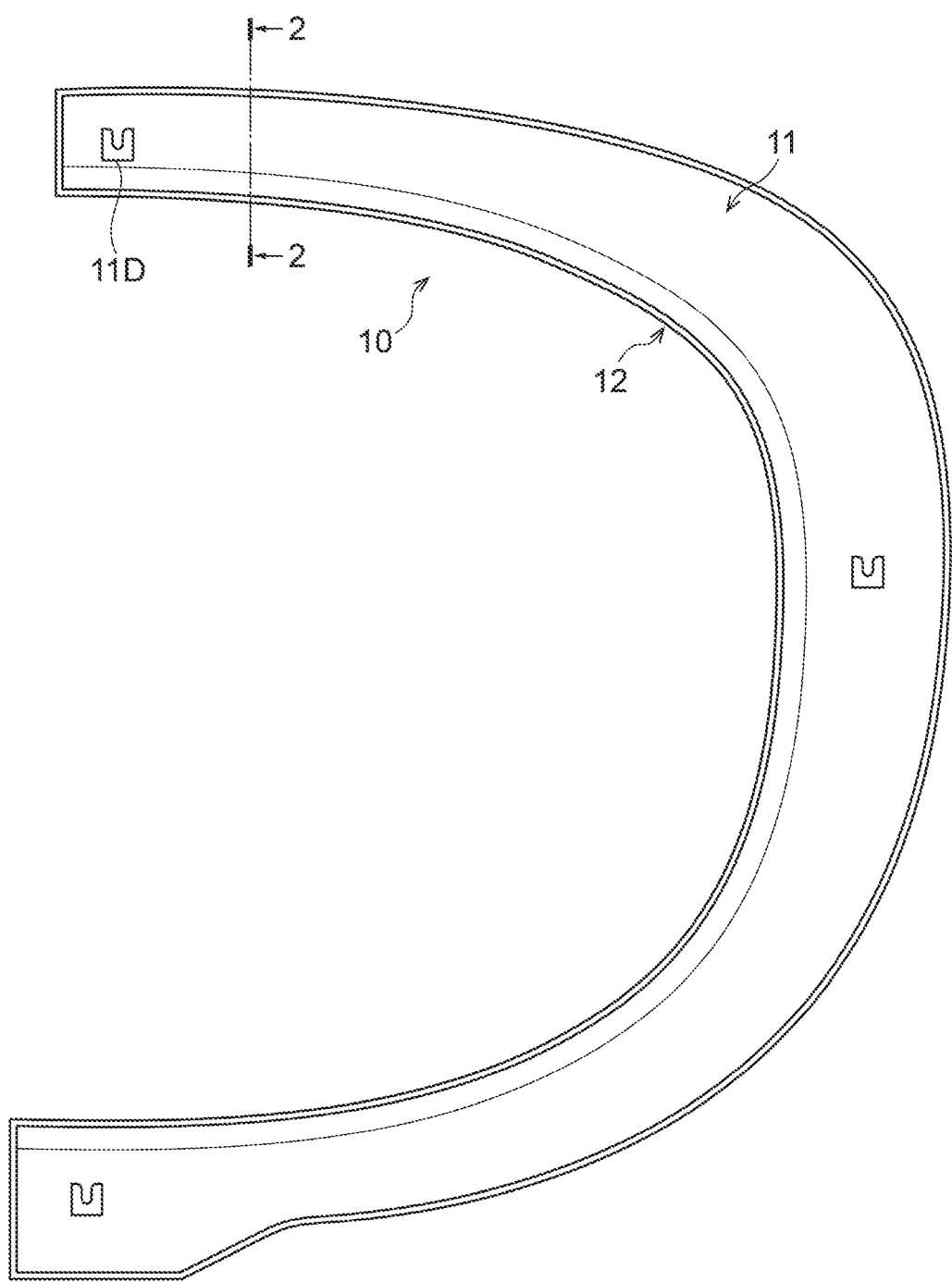
FIG. 1 is a rear view of an injection molded product of a present embodiment.

Embodiments of the disclosure are described below in detail. It is noted here, however, that the disclosure is not restricted to the below-described embodiments. In the below-described embodiments, the constituents thereof (including element steps and the like) are not indispensable unless otherwise specified. The same applies to the numerical values and ranges thereof, without restricting the disclosure.

In the disclosure, the term "step" encompasses not only steps discrete from other steps but also steps which cannot be clearly distinguished from other steps, as long as the intended purpose of the step is achieved.

In the disclosure, those numerical ranges that are expressed with "to" each denote a range that includes the numerical values stated before and after "to" as the minimum value and the maximum value, respectively.

In a set of numerical ranges that are stated stepwisely in the disclosure, the upper limit value or the lower limit value of a numerical range may be replaced with the upper limit value or the lower limit value of other numerical range. Further, in a numerical range stated in the disclosure, the upper limit or the lower limit of the numerical range may be replaced with a relevant value indicated in any of Examples.

In the disclosure, a component may include a plurality of different substances corresponding thereto.

In the disclosure, the term "layer" or "film" includes, when observing a region where a layer or film is present, a case in which the layer or the film is formed only on a part of the region in addition to a case in which the layer or the film is formed on the entirety of the region.

First, an injection molded product of the present embodiment is described. Then, a manufacturing device (mold) and a manufacturing method for manufacturing the injection molded product of the present embodiment are described.
<Injection Molded Product>

The injection molded product of the present disclosure has a main body portion having a design surface and an opposite surface and a projecting portion provided at a peripheral edge portion of the main body portion, and projecting out toward a side opposite from the design surface in a thickness direction of the main body portion. A thickness A of the main body portion and a thickness B of the projecting portion satisfy the relationship of the following formula (1).

$$A \geq B \qquad \text{formula (1)}$$

The projecting portion that is provided at the peripheral edge portion of the main body portion may be a flange for improving the strength of the injection molded product.

In a case in which the thickness of the main body portion is not uniform, the thickness A of the main body portion means the arithmetic mean of the thicknesses at five arbitrary points of the main body portion. Further, in a case in which the thickness of the projecting portion is not uniform, the thickness B of the projecting portion means the arithmetic mean of the thicknesses at five arbitrary points of the projecting portion.

A concrete example of the injection molded product is described with reference to the drawings, but the present disclosure is not limited to this. Further, the sizes of the respective regions in the respective drawings are schematic, and the relative relationships between the sizes of the respective regions are not limited to these.

The injection molded product of the present embodiment can be used, for example, as a part for an automobile. However, use of the injection molded product is not limited to a part for an automobile.

Figure 2:
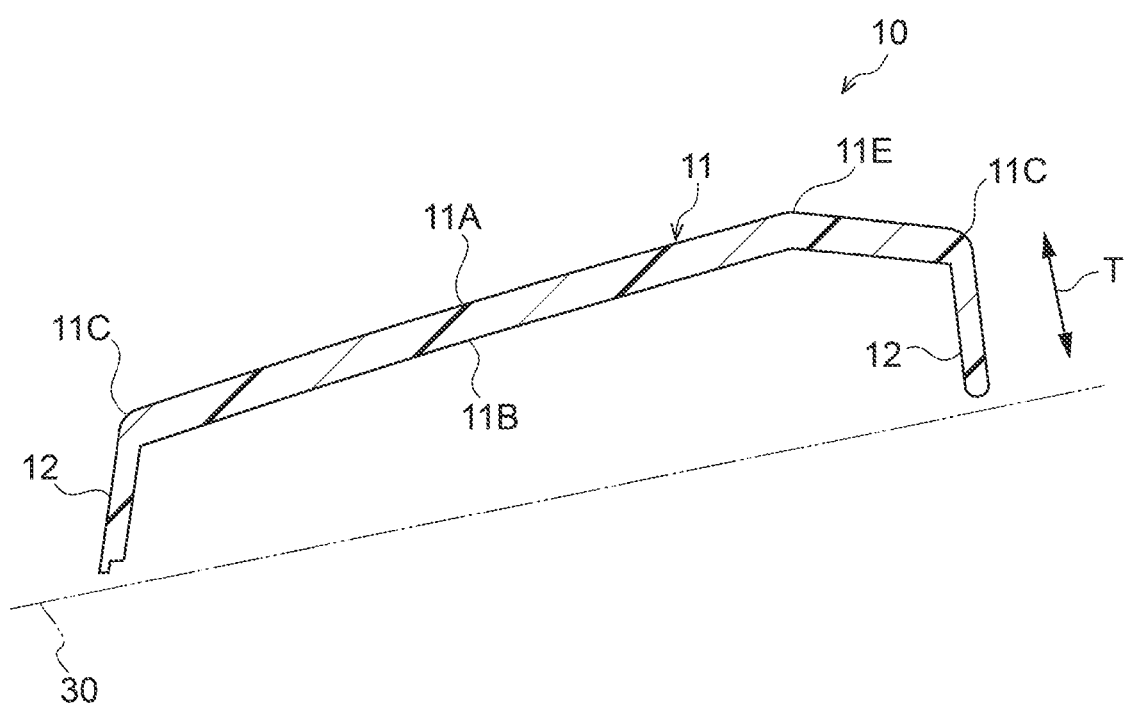
FIG. 2 is a vertical sectional view (a cross-sectional view along line 2-2 in FIG. 1) of the injection molded product of FIG. 1.

Injection molded product 10 shown in FIG. 1 is a part for an automobile, and is mounted to a vehicle body 30 (see FIG. 2). Note that examples of the part for an automobile are a bumper, a side mud guard, a fender, a back door garnish, a spoiler, and a radiator grill.

As shown in FIG. 2, the injection molded product 10 is formed of a resin material, and has a main body portion 11 having a design surface 11A and an opposite surface 11B, and a projecting portion 12 that is provided at a peripheral edge portion 11C of the main body portion 11 and projects-out toward the side opposite the design surface 11A in the thickness direction of the main body portion 11 (the direction shown by arrow T in FIG. 2). The main body portion 11 is shaped as a plate that is bent at a bent portion 11E, and plural vehicle body mounting portions 11D (see FIG. 1) are formed at the opposite surface 11B. The vehicle body mounting portions 11D are regions for mounting the main body portion 11 (the injection molded product 10) to the vehicle body 30 by using unillustrated mounting members.

As shown in FIG. 1, when the rear surface of the main body portion 11 is observed, the projecting portion 12 is provided once around along the peripheral edge portion 11C of the main body portion 11 (the outer periphery of the main body portion 11). Note that the present disclosure is not limited to the above-described structure, and may be structured such that the projecting portion 12 is provided discontinuously along the peripheral edge portion 11C of the main body portion 11, or may be structured such that the projecting portion 12 is provided at a portion of the peripheral edge portion 11C of the main body portion 11.

As shown in FIG. 2, in the present disclosure, when a cross-section of the main body portion 11 is observed, the projecting portion 12 exists at the terminal end of the main body portion 11. The surface, which is at the side that is continuous with the design surface 11A of the main body portion 11, of the projecting portion 12 may be the design surface, but does not have to be the design surface. Further, the surface, which is at the side that is continuous with the opposite surface 11B of the main body portion 11, of the projecting portion 12 does not have to be the design surface.

The injection molded product 10 is formed by molten resin being injected into a cavity of a mold for molding that is formed by a movable side mold and a fixed side mold, and the movable side mold being slightly core-back moved as needed.

Figure 3:
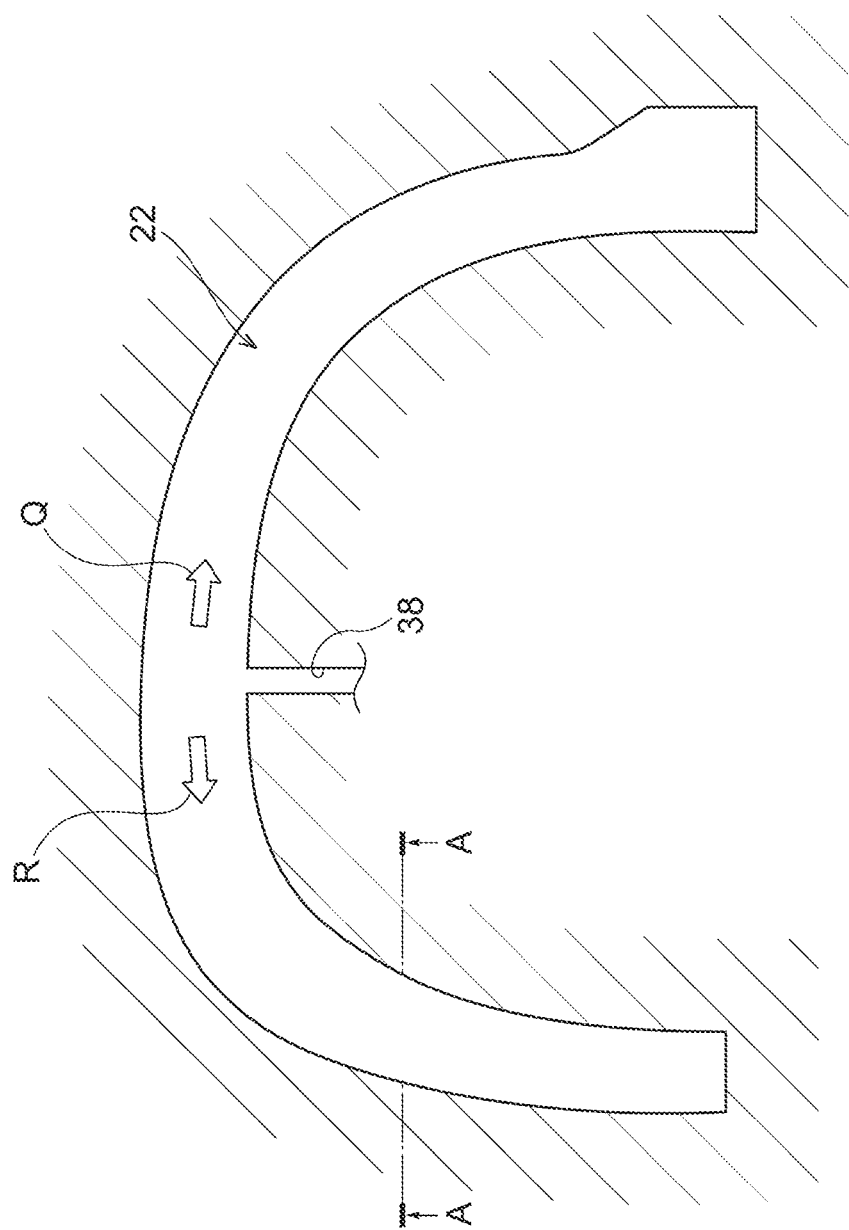
FIG. 3 is a plan view for explaining the shape of a cavity 22 that is formed by a movable side mold and a fixed side mold.
Figure 4:
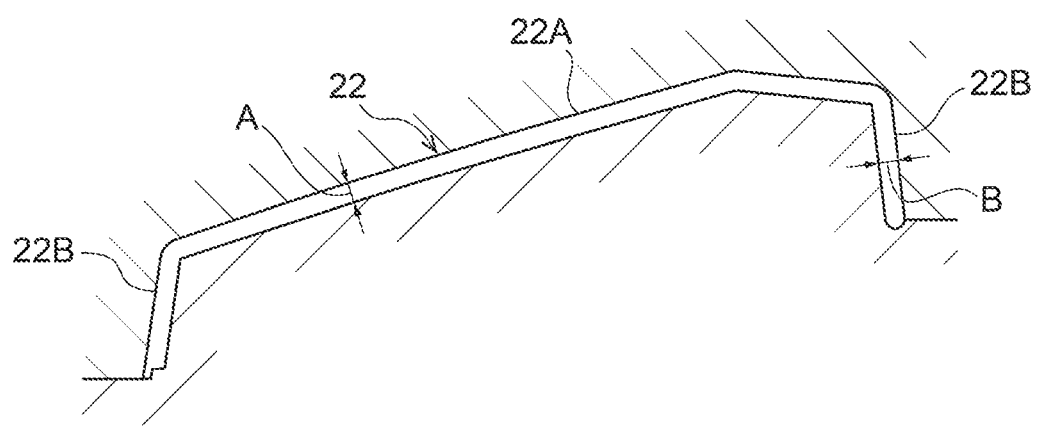
FIG. 4 is a cross-sectional view (a cross-sectional view along line A-A in FIG. 3) for explaining the shape of the cavity 22 that is formed by the movable side mold and the fixed side mold, and shows a case in which width A of cavity 22A and width B of cavity 22B have the relationship A=B.

FIG. 3 and FIG. 4 are schematic drawings for explaining the shape of a cavity 22 that is formed by the movable side mold and the fixed side mold. FIG. 3 is a plan view of the cavity 22, and FIG. 4 is a drawing showing the cross-section along line A-A of the cavity 22 shown in FIG. 3. The movable side mold and the fixed side mold that form the cavity 22 are not illustrated in FIG. 3 and FIG. 4 in order for the shape of the cavity 22 to be more easily understood.

As shown in FIG. 4, the cavity 22 has a cavity 22A that is the portion corresponding to the main body portion of the injection molded product, and a cavity 22B that is the portion corresponding to the flange of the injection molded product. In FIG. 4, width A of the cavity 22A and width B of the cavity 22B satisfy the relationship A=B.

The resin material, which is injected into the cavity 22 from a gate 38 shown in FIG. 3, flows within the cavity 22 along the arrow Q direction and the arrow R direction in FIG. 3, and reaches the ends of the cavity 22.

Figure 5:
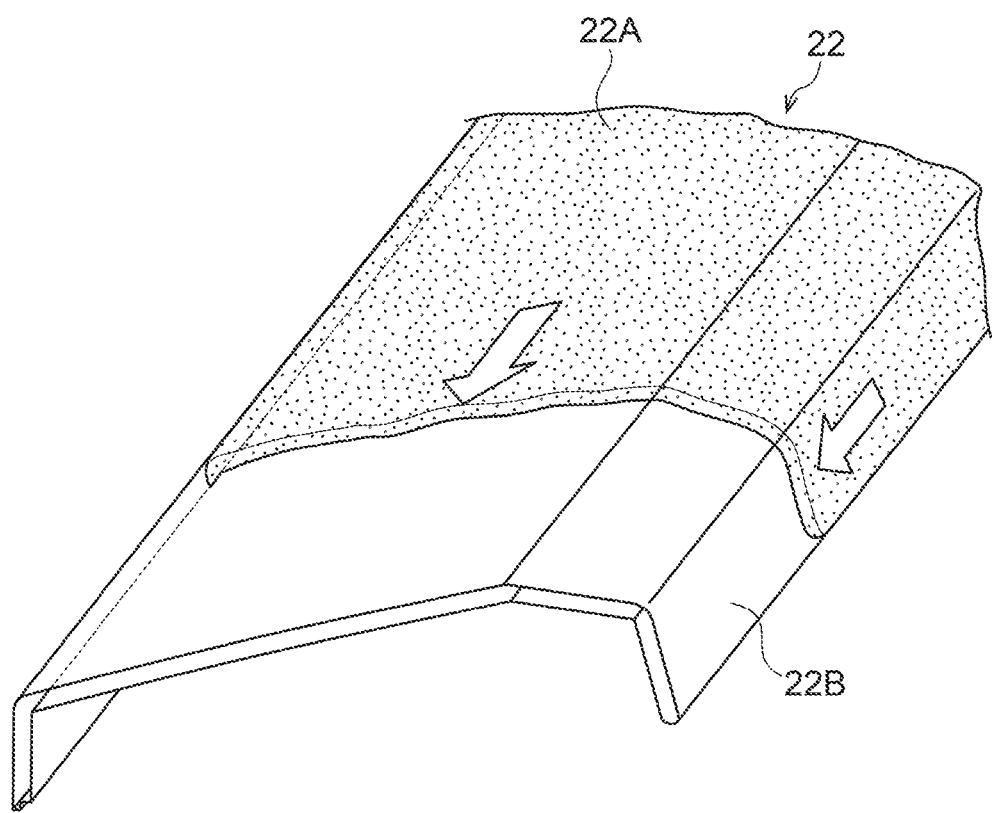
FIG. 5 is a schematic drawing for explaining the state of a resin material that flows within the cavity 22.
Figure 7:
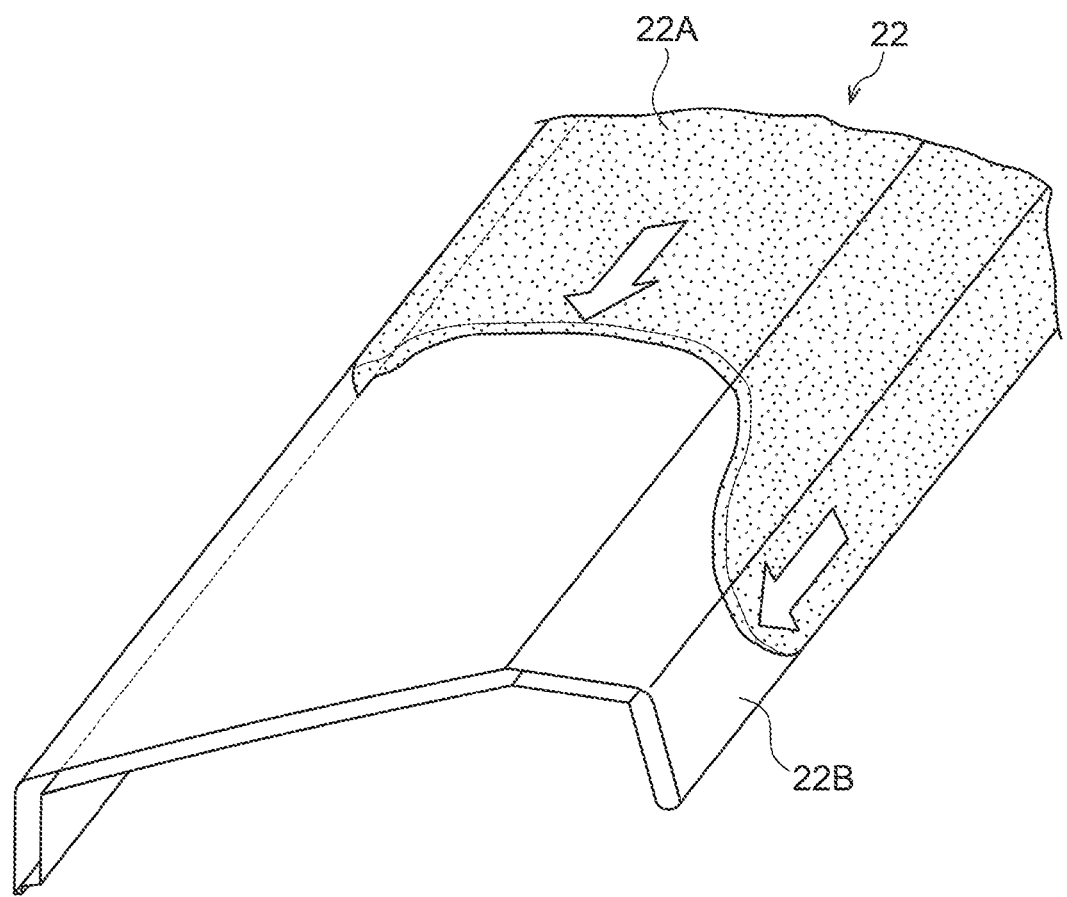
FIG. 7 is a schematic drawing for explaining the state of the resin material that flows within the cavity 22.

FIG. 5 is a schematic drawing for explaining the state of the resin material that flows within the cavity 22. The width A of the cavity 22A and the width B of the cavity 22B satisfy the relationship A=B, and the flow speed of the resin material that flows through the cavity 22A and the flow speed of the resin material that flows through the cavity 22B are approximately equal. Thus, the resin material that flows through the cavity 22B does not move ahead of the resin material that flows through the cavity 22A (see FIG. 7), and the resin material that flows through the cavity 22B is not confluent at the cavity 22A. As a result, the formation of weld lines at the cavity 22A is suppressed. Therefore, the formation of weld lines at the design surface of the injection molded product is suppressed.

Figure 6:
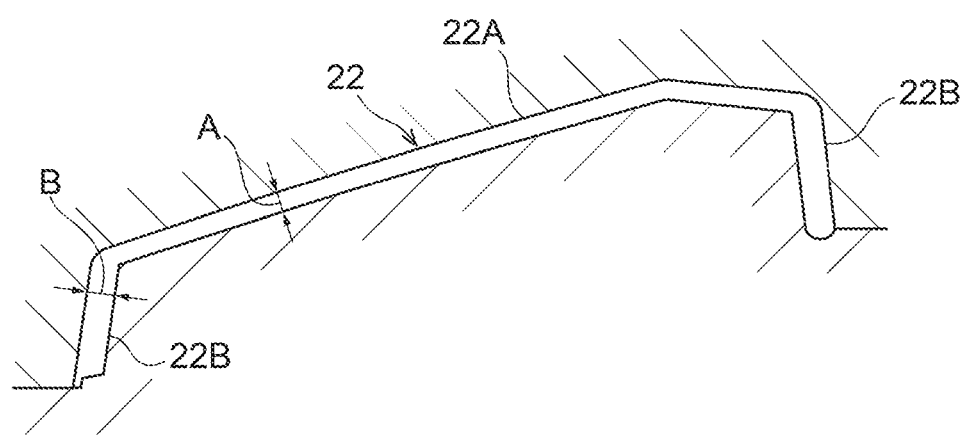
FIG. 6 is a cross-sectional view (a cross-sectional view along line A-A in FIG. 3) for explaining the shape of the cavity 22 that is formed by the movable side mold and the fixed side mold, and shows a case in which the width A of the cavity 22A and the width B of the cavity 22B have the relationship A<B.
Figure 8:
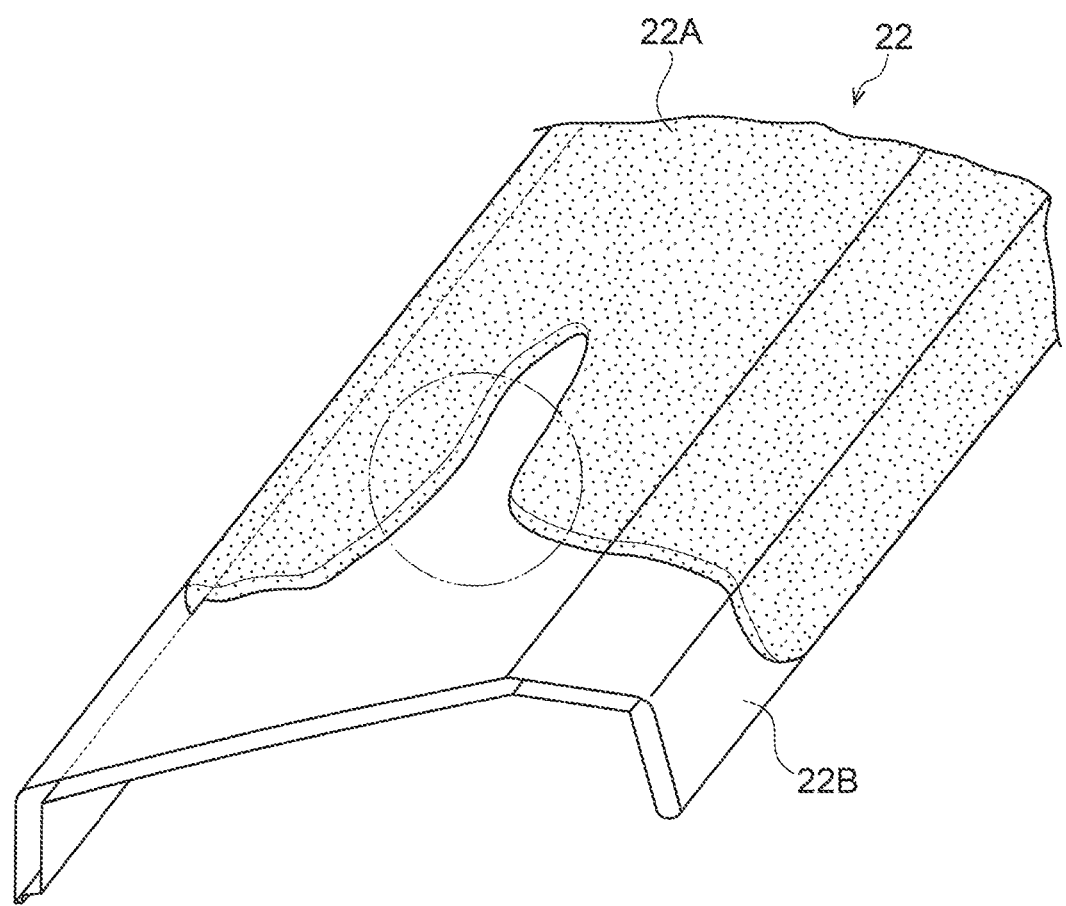
FIG. 8 is a schematic drawing for explaining the state of the resin material that flows within the cavity 22, and shows a place where resin from the cavity 22B, which resin flows toward the cavity 22A, is confluent.

On the other hand, as shown in FIG. 6, if the width A of the cavity 22A and the width B of the cavity 22B have the relationship A<B, the flow speed of the resin material that flows through the cavity 22A is lower than the flow speed of the resin material that flows through the cavity 22B. Thus, because the resin material that flows through the cavity 22B moves ahead of the resin material that flows through the cavity 22A (see FIG. 7), some of the resin material that flows through the cavity 22B flows toward the cavity 22A (see FIG. 8). The resin from the cavity 22B that flows toward the cavity 22A is confluent at the region shown by the dotted line in FIG. 8. There are cases in which a weld line forms at the place where the resin is confluent.

In a case in which the injection molded product of the present disclosure is molded by an injection molding method without core-back moving the mold, the width A of the cavity 22A corresponds to the thickness of the main body portion of the injection molded product, and the width B of the cavity 22B corresponds to the thickness of the flange of the injection molded product.

On the other hand, in a case in which the injection molded product of the present disclosure is molded by core-back moving the movable side mold, the width B of the cavity 22B and the thickness of the flange of the injection molded product coincide approximately, but the width A of the cavity 22A and the thickness of the main body portion of the injection molded product do not coincide, and the thickness of the main body portion is thicker than the width A of the cavity 22A. In a case in which the injection molded product of the present disclosure is molded by core-back moving the movable side mold, in order to ensure the flowability of the resin material at the cavity 22A, the thickness A of the main body portion and the thickness B of the projecting portion preferably satisfy the relationship of following formula (1').

$$A > B \qquad \text{formula (1')}$$

If the thickness A of the main body portion and the thickness B of the projecting portion at the injection molded product, which is molded by core-back moving the movable side mold, satisfy the relationship of formula (1'), it is easy for the width A of the cavity 22A and the width B of the cavity 22B to satisfy the relationship A≥B, and it is easy to suppress the formation of weld lines at the design surface of the injection molded product.

Further, in a case in which the injection molded product of the present disclosure is molded by core-back moving the movable side mold, it is desirable that the width A of the cavity 22A and the width B of the cavity 22B before the core-back satisfy the relationship of formula (1).

The resin material that forms the injection molded product 10 of the present embodiment is described later.

<Mold>

The mold for molding the injection molded product of the present embodiment has a fixed side mold, and a movable side mold that can move in opening/closing directions with respect to the fixed side mold, and that forms a cavity, which is a gap, between the movable side mold and the fixed side mold.

The mold can be used in injection molding, and can suitably be used in foam molding applications, and can more suitably be used in injection foam molding applications. However, the mold is not limited to these applications.

A concrete example of the mold is described hereinafter with reference to the drawings, but the present disclosure is not limited to this. Further, the sizes of the members in the respective drawings are schematic, and the relative relationships between the sizes of the members are not limited to these.

Figure 9:
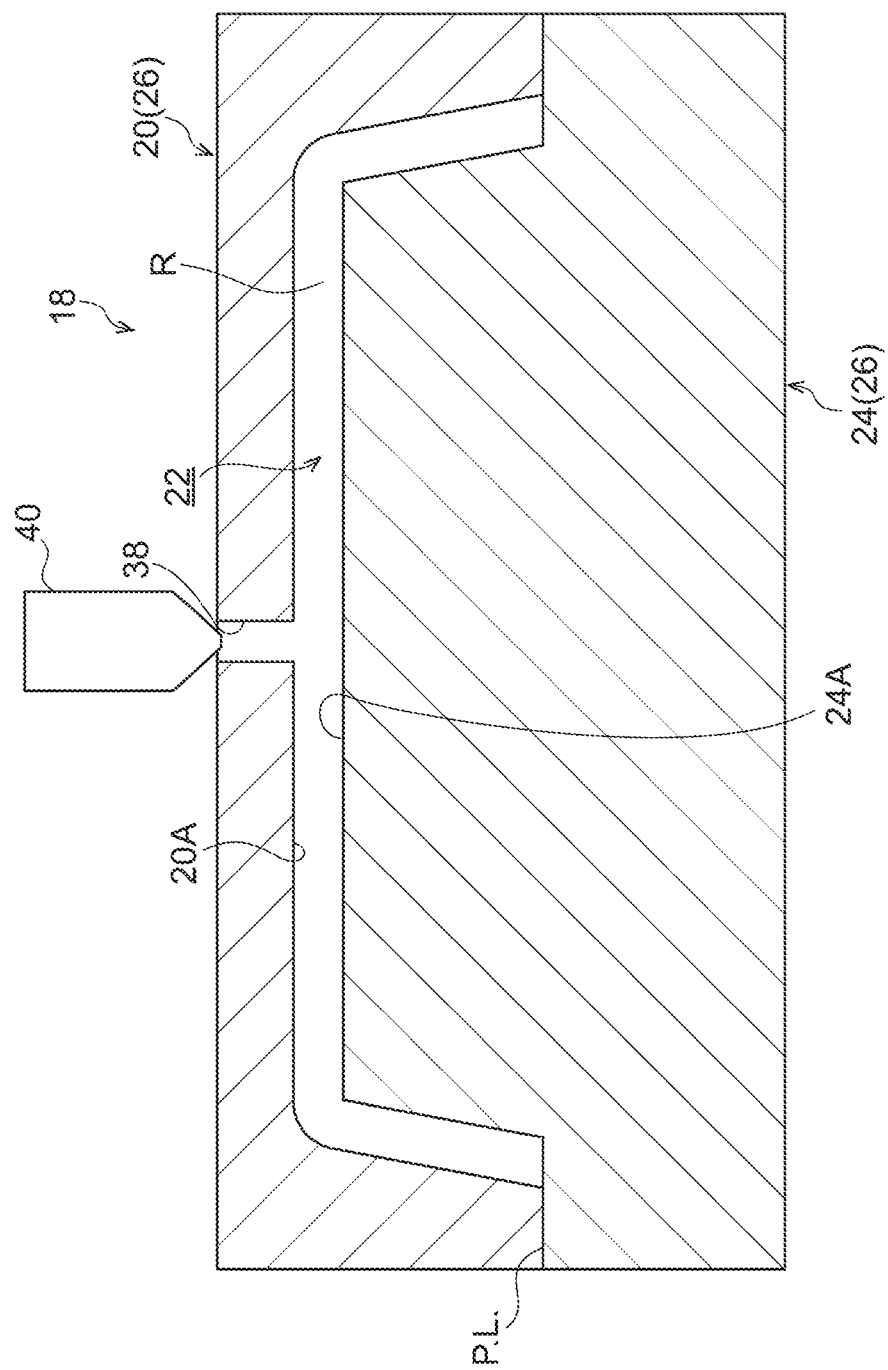
FIG. 9 is a schematic sectional view of a mold.

As shown in FIG. 9, a molding device 18 has a fixed side mold 20, and a movable side mold 24 that can move in opening/closing directions with respect to the fixed side mold 20, and that forms a cavity, which is a gap, between the movable side mold 24 and the fixed side mold 20. Note that, hereinafter, the fixed side mold 20 and the movable side mold 24 may be collectively called "mold 26".

The cavity 22 corresponds to the shape of the injection molded product 10. Further, a seam (parting line, P.L.) between the fixed side mold 20 and the movable side mold 24 is positioned at a place, which corresponds to the distal end of the projecting portion 12, of the cavity 22.

In the present embodiment, the obverse (the design surface 11A) of the main body portion 11 of the injection molded product 10, and the surface that is continuous with the design surface 11A of the main body portion 11 at the projecting portion 12, are formed by a cavity surface 20A that is formed at the fixed side mold 20. Further, the reverse surface (the opposite surface 11B) of the main body portion 11 of the injection molded product 10, and the surface that is continuous with the opposite surface 11B of the main body portion 11 at the projecting portion 12, are formed by a cavity surface 24A at the movable side mold 24. Note that the cavity 22 is the gap between the cavity surface 20A and the cavity surface 24A in the state in which the fixed side mold 20 and the movable side mold 24 are closed.

Further, the molding device 18 has the gate 38 that passes-through the fixed side mold 20 to the cavity 22, and an injecting device 40 that injects and fills resin material R, which is in a molten state, through the gate 38 into the cavity 22. The injecting device 40 has an unillustrated hopper (supplying portion) and an unillustrated cylinder. At this injecting device 40, a mixture that contains resin, a foaming agent, additives and the like is supplied to the cylinder from the hopper (supplying portion), and is mixed by a screw or the like within the cylinder, and is prepared as the resin material R, and the resin material. R is injected and filled through the gate 38 into the cavity 22 at a predetermined pressure. Note that the injecting device 40 is not limited to the above-described structure provided that it can inject and fill the resin material R, which is in a molten state, through the gate 38 into the cavity 22.

<Method of Manufacturing Injection Molded Product>

The injection molded product of the present disclosure may be manufactured through manufacturing steps that include a step of injecting a resin material from a gate into a cavity of a mold that has a fixed side mold having the gate through which a resin material is injected; and a movable side mold that can move in opening/closing directions with respect to the fixed side mold, and that forms a cavity, which is a gap, between the movable side mold and the fixed side mold.

In a case in which the injection molded product is a foam molded product, the foam molded product can be manufactured through a step of injecting a resin material from a gate into a cavity of a mold that has a fixed side mold having the gate through which a resin material is injected; and a movable side mold that can move in opening/closing directions with respect to the fixed side mold, and that forms a cavity, which is a gap, between the movable side mold and the fixed side mold; and a step of, after filling an interior of the cavity with the resin material in the above-described injecting step, moving the movable side mold in an opening direction from the fixed side mold, and enlarging a volume of the interior of the cavity. However, the steps for manufacturing the foam molded product are not limited to those of the above-described method. The main body portion of the foam molded product has a foamed layer at the interior thereof.

As shown in FIG. 9, the resin material R that contains a foaming agent is injected and filled from the injecting device 40 through the gate 38 into the cavity 22. In a case in which the resin material R is formed from a thermoplastic resin, the resin material R is heated and made flowable, and is supplied into the cavity 22.

Here, it is preferable to set the temperature of the cylinder at the region that is ⅓ to ½ of the entire length of the cylinder from the exit of the hopper of the injecting device 40 of the resin material R, to be less than or equal to 250° C. This is the temperature at a region, excluding the exit of the hopper. By setting the temperature of this region of the cylinder to less than or equal to 250° C., the foaming gas escaping from the hopper exit side can be suppressed, and it is easy to achieve effects such as an improvement in foamability, and stability, and the like at the time of molding.

The resin material that is used in the present embodiment is not particularly limited. For example, resin materials that are used in injection foam molding generally contain a resin and a foaming agent. Examples of the resin that is used in the resin material R include at least one type of resin selected from the group consisting of polyethylene resins, polypropylene resins (PP), composite polypropylene resins (PPC), polystyrene resins, polyethylene terephthalate resins, polyvinyl alcohol resins, vinyl chloride resins, ionomer resins, polyamide resins, acrylonitrile butadiene styrene copolymer resins (ABS), and polycarbonate resins. Thereamong, at least one type of resin selected from the group consisting of polypropylene resins (PP), composite polypropylene resins (PPC), and acrylonitrile butadiene styrene copolymer resins (ABS) is preferable.

Further, examples of the foaming agent include organic foaming agents such as azodicarbonamide and the like, inorganic foaming agents such as sodium hydrogen carbonate (other names: sodium bicarbonate, bicarbonate of soda) and the like, and the like. Presently, inorganic sodium hydrogen carbonate is mainly used as a foaming agent in the foam molding of interior parts for automobiles, but, from the standpoint of improving the coating performance (hot water resistance and the like), organic foaming agents are preferable.

Examples of organic foaming agents are azodicarbonamide (ADCA), N,N-dinitroso pentamethylene tetramine (DPT), 4,4-oxybis benzenesulfonyl hydrazide (OBSH), hydrazodicarbonamide (HDCA) and the like. Azodicarbonamide (ADCA) is preferable.

Further, the mold 26 is usually a temperature that is lower than the resin material R that is supplied therein. Therefore, due to the resin material R being filled into the cavity 22, hardening of the resin material R starts from the portions that contact the mold.

Note that, before injecting the resin material R into the cavity 22, it is preferable to fill nitrogen gas into the cavity 22 in advance, and it is more preferable to heat the nitrogen gas and fill it into the cavity 22. By heating the nitrogen gas that is to be filled, a sudden drop in temperature of the cavity 22 interior (the mold) can be suppressed, and the foamability of the resin material R can be stabilized. Further, by heating the nitrogen gas that is to be filled, the foamability is not affected by the external air temperature, the external air temperature dependence of the foaming force of the resin material R can be suppressed, and the foamability of the resin material R can be stabilized.

The distance over which the resin material R flows within the cavity 22 is not particularly limited, and is preferably less than or equal to 600 mm, and more preferably less than or equal to 400 mm. If the flowing distance of the resin material R is less than or equal to 600 mm, the distance from the gate 38 to the terminal ends of the cavity 22 is shortened, and, due thereto, a decrease in the temperature of the resin material R is prevented, and it is easy to suppress pressure loss within the cavity 22. As a result, there is the tendency for the formation of craters and swirls at the design surface to be suppressed.

Next, the movable side mold 24 is opened (core-back) by a predetermined amount in the opening direction (the mold opening direction) with respect to the fixed side mold 20, and the resin material R that has not hardened is foamed, and a foamed layer is formed within the foam molded product. Thereafter, the fixed side mold 20 and the movable side mold 24 are opened, and, by removing the foam molded product from the fixed side mold 20, the foam molded product is obtained.

Note that the present disclosure is not limited to the specific structures of the above-described embodiments, and can be modified in various ways within a scope that does not depart from the gist thereof.

The disclosures of Japanese Patent Application No. 2019-187076, which was filed on Oct. 10, 2019, are hereby incorporated by reference in its entirety.

All the documents, patent applications and technical standards that are described in the present specification are hereby incorporated by reference to the same extent as if each individual document, patent application or technical standard is concretely and individually described to be incorporated by reference.

REFERENCE SIGNS LIST

10 Injection molded product
11 Main body portion
12 Projecting portion
18 Molding device
20 Fixed side mold
22 Cavity
24 Movable side mold
26 Mold
30 Vehicle body
38 Gate
40 Injecting device

The invention claimed is:

1. An injection molded product comprising:
a main body portion having a design surface and an opposite surface and being shaped as a plate that is bent at a bent portion; and
a projecting portion provided at a peripheral edge portion of the main body portion, and projecting out toward a side opposite from the design surface in a thickness direction of the main body portion,
wherein a thickness A of the main body portion and a thickness B of the projecting portion satisfy a relationship of the following formula (1)
when a cross-section of the main body portion is observed, the projecting portion exists at a terminal end of the main body portion,
the projecting portion has a foamed layer at an interior thereof, and the thickness of the projecting portion is uniform, $$A \geq B \qquad \text{formula (1).}$$

2. The injection molded product according to claim 1, wherein the main body portion has a foamed layer at an interior thereof.

3. A method of manufacturing an injection molded product comprising:
a main body portion having a design surface and an opposite surface and being shaped as a plate that is bent at a bent portion; and
a projecting portion provided at a peripheral edge portion of the main body portion, and projecting out toward a side opposite from the design surface in a thickness direction of the main body portion,
wherein a thickness A of the main body portion and a thickness B of the projecting portion satisfy a relationship of the following formula (1),
when a cross-section of the main body portion is observed, the projecting portion exists at a terminal end of the main body portion, and
the thickness of the projecting portion is uniform,
the method comprising manufacturing steps that include a step of injecting a resin material from a gate into a cavity of a mold that has: a fixed side mold having the gate through which a resin material is injected; and a movable side mold that can move in opening/closing directions with respect to the fixed side mold, and that forms the cavity, which is a gap, between the movable side mold and the fixed side mold,
wherein a distance over which the resin material flows within the cavity is less than or equal to 600 mm, $$A \geq B \qquad \text{formula (1).}$$

4. The method of manufacturing an injection molded product according to claim 3, wherein:
the manufacturing steps further include a step of, after filling an interior of the cavity with the resin material in the injecting step, moving the movable side mold in an opening direction from the fixed side mold, and enlarging a volume of the interior of the cavity, and
the main body portion has a foamed layer at an interior.

* * * * *